United States Patent
Diaconu et al.

(10) Patent No.: US 10,133,768 B2
(45) Date of Patent: *Nov. 20, 2018

(54) LATEST EXTERNAL DEPENDEE ENTITY IN TRANSACTION RECORD

(71) Applicant: Microsoft Technology Licensing, LLC, Redmond, WA (US)

(72) Inventors: Cristian Diaconu, Kirkland, WA (US); Daniel Vasquez Lopez, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

This patent is subject to a terminal disclaimer.

(21) Appl. No.: 14/686,503

(22) Filed: Apr. 14, 2015

(65) Prior Publication Data
US 2016/0306839 A1    Oct. 20, 2016

(51) Int. Cl.
*G06F 17/30* (2006.01)

(52) U.S. Cl.
CPC .. *G06F 17/30368* (2013.01); *G06F 17/30371* (2013.01); *G06F 17/30377* (2013.01); *G06F 17/30604* (2013.01)

(58) Field of Classification Search
CPC ......... G06F 17/30368; G06F 17/30604; G06F 17/30377; G06F 17/30371
See application file for complete search history.

(56) References Cited

U.S. PATENT DOCUMENTS

| 5,721,815 A | | 2/1998 | Ottesen et al. |
| 5,806,075 A | * | 9/1998 | Jain .................... G06F 17/30575 |
| 5,845,292 A | | 12/1998 | Bohannon et al. |

(Continued)

FOREIGN PATENT DOCUMENTS

CN    101625655 B    5/2011

OTHER PUBLICATIONS

International Search Report and Written Opinion for PCT Application No. PCT/US2016/026854, dated Jul. 18, 2016.

(Continued)

*Primary Examiner* — Miranda Le
(74) *Attorney, Agent, or Firm* — Workman Nydegger (57) ABSTRACT

The creation of transaction segment records that are each associated with transaction segments within a log that includes multiple tasks, each of at least some associated with a corresponding transaction. The transaction segment records each include a transaction identifier set that define which tasks are included within the transaction segment. The transaction identifier sets are non-overlapping such that the transaction segments may be processed substantially in parallel by dispatching the transaction segment records to different worker threads. The identity of a latest external dependee entity, if any, is included within the transaction segment record. Upon being assigned a transaction segment for processing, the module assigned the transaction segment awaits completion of processing of the latest external dependee entity prior to processing the transaction segment. Accordingly, transaction segments may be processed substantially in parallel, while in those cases in which there is a dependency, the dependency is honored.

17 Claims, 8 Drawing Sheets

(56) References Cited

U.S. PATENT DOCUMENTS

| | | | |
|---|---|---|---|
| 6,052,695 A | 4/2000 | Abe | |
| 6,154,847 A | 11/2000 | Schofield et al. | |
| 6,349,310 B1* | 2/2002 | Klein | G06F 17/30339 |
| | | | 707/703 |
| 6,353,828 B1* | 3/2002 | Ganesh | G06F 17/30362 |
| 6,397,227 B1* | 5/2002 | Klein | G06F 17/30377 |
| 6,446,086 B1 | 9/2002 | Bartlett et al. | |
| 6,477,546 B1* | 11/2002 | Velamuri | H04Q 3/005 |
| 6,484,181 B2* | 11/2002 | Attaluri | G06F 17/30595 |
| 6,557,048 B1 | 4/2003 | Keller et al. | |
| 6,625,601 B1 | 9/2003 | Molloy | |
| 6,728,719 B1* | 4/2004 | Ganesh | G06F 17/3048 |
| 6,801,938 B1 | 10/2004 | Bookman et al. | |
| 7,007,269 B2 | 2/2006 | Sluiman et al. | |
| 7,293,145 B1 | 11/2007 | Baird et al. | |
| 7,451,168 B1 | 11/2008 | Patterson | |
| 7,487,160 B2* | 2/2009 | Whyte | G06F 9/466 |
| 7,512,740 B2 | 3/2009 | Diefendorff | |
| 7,519,628 B1 | 4/2009 | Leverett et al. | |
| 7,761,766 B2 | 7/2010 | Boldt et al. | |
| 7,844,760 B2 | 11/2010 | Jeyaseelan et al. | |
| 8,032,885 B2 | 10/2011 | Fish | |
| 8,311,993 B2* | 11/2012 | Kumar | G06F 11/1474 |
| | | | 707/690 |
| 8,352,425 B2* | 1/2013 | Bourbonnais | G06F 17/30578 |
| | | | 707/615 |
| 8,489,655 B2* | 7/2013 | Aronovich | G06F 17/30115 |
| | | | 707/826 |
| 8,589,890 B2* | 11/2013 | Eccles | G06F 11/3636 |
| | | | 711/117 |
| 8,650,169 B1* | 2/2014 | Jacobs | G06F 17/30551 |
| | | | 707/704 |
| 8,671,085 B2 | 3/2014 | Dhamankar et al. | |
| 8,719,462 B1 | 5/2014 | He et al. | |
| 8,738,568 B2 | 5/2014 | Ghosh et al. | |
| 8,745,012 B2 | 6/2014 | Rusher et al. | |
| 8,850,452 B2 | 9/2014 | Vishnu | |
| 8,868,234 B2 | 10/2014 | Sanders et al. | |
| 8,868,527 B1* | 10/2014 | Fallis | H04L 41/08 |
| | | | 707/703 |
| 8,880,480 B2 | 11/2014 | Kundu et al. | |
| 9,138,652 B1 | 9/2015 | Thompson et al. | |
| 9,256,477 B2 | 2/2016 | Truong et al. | |
| 9,262,519 B1 | 2/2016 | Saurabh et al. | |
| 9,418,094 B2* | 8/2016 | Wong | G06F 17/30451 |
| 9,460,008 B1* | 10/2016 | Leshinsky | G06F 17/30185 |
| 9,563,397 B1 | 2/2017 | Stoev et al. | |
| 9,619,544 B2 | 4/2017 | Vermeulen et al. | |
| 9,760,617 B2* | 9/2017 | Shang | G06F 17/30578 |
| 2002/0103683 A1 | 8/2002 | Tsuda | |
| 2002/0120929 A1 | 8/2002 | Schwalb et al. | |
| 2002/0188831 A1 | 12/2002 | Jackson et al. | |
| 2003/0061537 A1 | 3/2003 | Cha et al. | |
| 2005/0223366 A1* | 10/2005 | Smith | G06F 11/3476 |
| | | | 717/128 |
| 2006/0212492 A1* | 9/2006 | Jacobs | G06F 17/30551 |
| 2007/0220356 A1 | 9/2007 | Ruscio et al. | |
| 2007/0255979 A1* | 11/2007 | Deily | G06F 11/3476 |
| | | | 714/45 |
| 2008/0058961 A1 | 3/2008 | Biberdorf et al. | |
| 2008/0066055 A1 | 3/2008 | Shebs | |
| 2008/0140733 A1 | 6/2008 | Chan et al. | |
| 2008/0270403 A1 | 10/2008 | Bookman et al. | |
| 2008/0270838 A1 | 10/2008 | Dorai et al. | |
| 2009/0150599 A1 | 6/2009 | Bennett | |
| 2009/0287874 A1 | 11/2009 | Rogers et al. | |
| 2009/0287890 A1 | 11/2009 | Bolosky | |
| 2010/0185895 A1 | 7/2010 | Clark et al. | |
| 2010/0215143 A1 | 8/2010 | Basu et al. | |
| 2011/0029490 A1 | 2/2011 | Agarwal et al. | |
| 2011/0082835 A1 | 4/2011 | Agarwal et al. | |
| 2011/0161723 A1 | 6/2011 | Taleck et al. | |
| 2011/0202546 A1 | 8/2011 | Amit et al. | |
| 2011/0264898 A1 | 10/2011 | Chaudrhy et al. | |
| 2012/0109895 A1 | 5/2012 | Zwilling et al. | |
| 2012/0209817 A1 | 8/2012 | Golab et al. | |
| 2012/0278288 A1 | 11/2012 | Deshmukh et al. | |
| 2012/0290752 A1 | 11/2012 | Lim | |
| 2013/0117233 A1 | 5/2013 | Schreter | |
| 2013/0117234 A1 | 5/2013 | Schreter | |
| 2013/0232400 A1 | 9/2013 | Finnell et al. | |
| 2013/0290268 A1 | 10/2013 | Schreter | |
| 2013/0290649 A1 | 10/2013 | Jorgensen et al. | |
| 2013/0332435 A1 | 12/2013 | Bernstein et al. | |
| 2014/0007119 A1 | 1/2014 | Liu et al. | |
| 2014/0032595 A1 | 1/2014 | Makkar et al. | |
| 2014/0172803 A1 | 6/2014 | Diaconu et al. | |
| 2014/0244701 A1* | 8/2014 | Welton | G06F 17/30463 |
| | | | 707/827 |
| 2014/0279930 A1 | 9/2014 | Gupta et al. | |
| 2015/0100708 A1 | 4/2015 | Kegel | |
| 2015/0127679 A1 | 5/2015 | Wing | |
| 2015/0363396 A1 | 12/2015 | Sengupta et al. | |
| 2016/0147859 A1* | 5/2016 | Lee | G06F 17/30371 |
| | | | 707/615 |
| 2016/0306654 A1 | 10/2016 | Diaconu et al. | |
| 2016/0306659 A1 | 10/2016 | Diaconu et al. | |
| 2016/0306713 A1 | 10/2016 | Diaconu et al. | |
| 2016/0306838 A1 | 10/2016 | Diaconu et al. | |
| 2016/0306841 A1 | 10/2016 | Diaconu et al. | |
| 2016/0306856 A1 | 10/2016 | Diaconu et al. | |

OTHER PUBLICATIONS

Office Action dated Mar. 9, 2016 cited in U.S. Appl. No. 14/686,525.
Final Office Action dated Aug. 9, 2016 cite in U.S. Appl. No. 14/686,525.
Office Action dated Sep. 19, 2016 issued in U.S. Appl. No. 14/686,515.
"International Preliminary Report on Patentability Issued in PCT Application No. PCT/US2016/026854", Dated: Oct. 21, 2016, 7 Pages.
Office Action issued in U.S. Appl. No. 14/686,480 dated Jan. 13, 2017.
Wigmore "What is a Log (Log File)" Nov. 2014, WhatIs.com, p. 1.
Notice of Allowance dated Mar. 9, 2017 cited in U.S. Appl. No. 14/686,525.
Office Action dated Mar. 27, 2017 cited in U.S. Appl. No. 14/686,515.
Notice of Allowance issued in U.S. Appl. No. 14/686,525 dated May 12, 2017.
Randal, "Disaster recovery 101: backing up the tail of the log", Jun. 18, 2010, https://www.sqlskills.compgs. 1-4.
Randal, "Advanced Backup and Restore Optiosn", May 18, 2011, http://sqlmag.com, pp. 1-7.
Poolet, "Backup and Restore Fundamentals", May 27, 2008, http://sqlmag.com, pp. 1-8.
Poolet, "What is a TailLog Backup?", Feb. 24, 2008, http://sqlmag.com, p. 1.
Office Action dated Jun. 16, 2017 cited in U.S. Appl. No. 14/686,480.
Office Action dated Jul. 3, 2017 cited in U.S. Appl. No. 14/686,544.
Office Action dated Jul. 28, 2017 cited U.S. Appl. No. 14/686,560.
Haraty, et al., "Damage Assessment and Recovery from Malicious Transactions Using Data Dependency for Defensive Information Warfare", In Proceedings of Science and Technology Vision, vol. 3, No. 4, Nov. 2007, pp. 43-50.
Patnaik, et al., "Transaction-Relationship Oriented Log Division for Data Recovery from Information Attacks", In Journal of Database Management, vol. 14, Issue 2, Apr. 2003, 3 pages.
Faleiro, et al., "Lazy Evaluation of Transactions in Database Systems", In Proceedings of ACM SIGMOD International Conference on Management of Data, Jun. 22, 2014, pp. 15-26.
Lomet, David, "Application Recovery: Advances toward an Elusive Goal", In Proceedings of International Workshop on High Performance Transaction Systems, Sep. 09, 4 pages.
"Oracle GoldenGate Performance Best Practices", In Oracle White Paper, Nov. 2014, 51 pages.
Diaconu, et al., "Hekaton: SQL Server's Memory-Optimized OLTP Engine", In Proceedings of ACM SIGMOD International Conference on Management of Data, Jun. 22, 2013, pp. 1243-1254.

(56) References Cited

OTHER PUBLICATIONS

"Set Segmenting Specification VI", Retrieved on: Dec. 18, 2014, Available at: http://zone.ni.com/reference/en-XX/help/372846H-01/veristandmerge/set_segmenting_specification/.
Office Action issued in U.S. Appl. No. 14/686,480 dated Oct. 4, 2017.
Office Action issued in U.S. Appl. No. 14/686,494 dated Sep. 13, 2017.
Office Action issued in U.S. Appl. No. 14/686,544 dated Jan. 24, 2018.
Office Action issued in U.S. Appl. No. 14/868,560 dated Jan. 24, 2018.
Ferri, Cesare: "Energy Efficient Synchronization Techniques for Embedded Architectures," 2008.
Notice of Allowance issued in U.S. Appl. No. 14/686,515 dated Dec. 27, 2017.
"Non Final Office Action Issued in U.S. Appl. No. 15/959,211", dated Aug. 9, 2018, 18 Pages.

\* cited by examiner

LATEST EXTERNAL DEPENDEE ENTITY IN TRANSACTION RECORD

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Often, tasks performed on a data system (such as a database system) are logged. For instance, each tasks performed has an associated entry in a log, with the entry having a log entry identifier (such as a log sequence number). Furthermore, in some cases, tasks are performed as part of a transaction such that either all of the tasks of the transaction are performed (if the transaction is "committed") or none of the tasks of the transaction are performed (if the transaction is "aborted"). Thus, after a transaction initiates, as tasks are performed for the transaction, it is not yet clear whether or not those tasks will be undone due to an abort of the transaction. Only upon a commit of the transaction is it clear that the task is performed.

In data systems that perform transactions in parallel, with tasks of different transactions being completed, the task entries associated with transactions are often interleaved within the log. For instance, the last task of a prior transaction is often completed after the first task of the next transaction is completed, resulting in overlap in tasks associated with neighboring temporal transactions. Often, a subsequent transaction initiated after a prior transaction will complete before the prior transaction is complete, resulting in some reordering of transaction completions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the creation of transaction segment records that are each associated with transaction segments within a log that includes multiple tasks, each of at least some associated with a corresponding transaction. The transaction segment records each include a transaction identifier set that defines which tasks are included within the transaction segment. The transaction identifier sets are non-overlapping such that the transaction segments may be processed substantially in parallel by dispatching the transaction segment records to different worker threads.

In some cases, however, a transaction within a particular transaction segment may depend on completion of processing of external latest dependee entity, such as perhaps another transaction segment or a transaction in another transaction segment. The identity of the external latest dependee entity, if any, is included within the transaction segment record. Upon being assigned a transaction segment record for processing (e.g., to redo the transaction(s) of a transaction segment), if the latest external dependee entity is identified, the module assigned the transaction segment awaits completion of processing of the latest external dependee entity prior to processing the transaction segment. Accordingly, transaction segments may be processed substantially in parallel, while in those cases in which there is a dependency, the dependency is honored.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the creation of transaction segment records that are each associated with transaction segments within a log that includes multiple tasks, each of at least some associated with a corresponding transaction. The transaction segment records each include a transaction identifier set that defines which tasks are included within the transaction segment. The transaction identifier sets are non-overlapping such that the transaction segments may be processed substantially in parallel by dispatching the transaction segment records to different worker threads.

In some cases, however, a transaction within a particular transaction segment may depend on completion of processing of external latest dependee entity, such as perhaps another transaction segment or a transaction in another transaction segment. The identity of the external latest dependee entity, if any, is included within the transaction segment record. Upon being assigned a transaction segment for processing (e.g., to redo the transaction(s) of a transaction segment), if the latest external dependee entity is identified, the module assigned the transaction segment awaits completion of processing of the latest external dependee entity prior to processing the transaction segment. Accordingly, transaction segments may be processed substantially in parallel, while in those cases in which there is a dependency, the dependency is honored.

Some introductory discussion of a computing system will be described with respect to FIG. 1. Then, the creation of transaction segment records will be described with respect to FIGS. 2 through 8. The dispatch and parallel processing of the transaction segments will then be described with respect to FIGS. 9 through 11.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
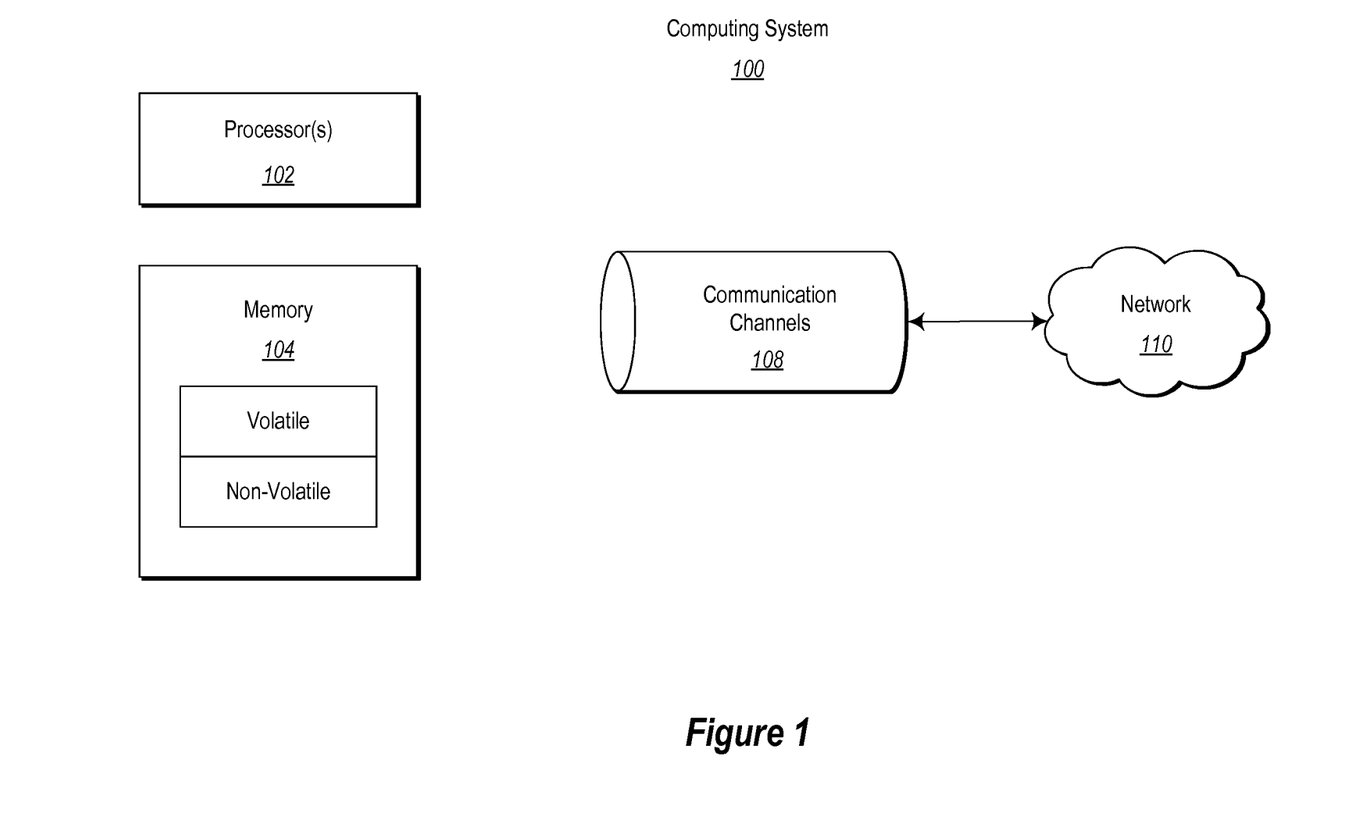
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
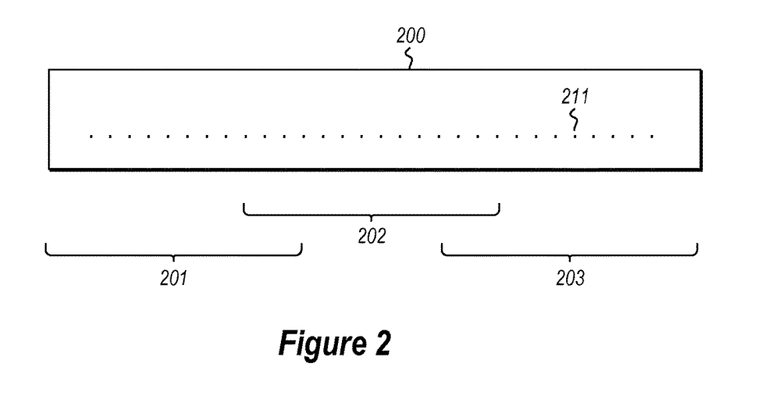
FIG. 2 abstractly illustrates a log that might be kept by a computing system such as the computing system of FIG. 1, in which there are several transaction segments that overlap in log entries.

FIG. 2 abstractly illustrates a log 200 that might be kept by a computing system such as the computing system 100 of FIG. 1. As symbolically represented by represented the continuous ellipses 211, the log 200 is filled with entries associated with tasks performed on the computing system 100. Each task may correspond to an associated transaction. However, since transactions are performed by the computing system 100 in parallel with multiple transactions being active at a time, the order of completion of the transactions is not guaranteed, and often is not, the same as the order that the transactions were initiated. After all, some transactions may be more long running than others just due to the wide variety of transactions that may be performed.

In accordance with the principles described herein, a transaction segment record is created for transactions within a particular transaction identifier range. The transaction segment records are created so that each transaction segment record includes a transaction identifier range that does not overlap with the transaction identifier range of any other transaction segment record, including any neighboring transaction segment record. The transaction identifier range is an example of a transaction identifier set. The transaction identifier set defined in the transaction segment record may include a single transaction identifier or perhaps multiple transaction identifiers. The transaction identifier set is an example of a transaction segment definition that defines which log entries of the log are to be included within that transaction segment based on whether the log entry is a part of any of the transactions identified in the transaction identifier set.

In this description and in the claims, a particular transaction identifier range would "overlap" a comparison transaction identifier range if 1) any transaction identifiers within the particular transaction identifier range was indicative of being a transaction completed (i.e., committed or aborted) between an earliest and latest completed transactions of the comparison transaction identifier range or 2) any transaction identifiers within the comparison transaction identifier range was indicative of being a transaction completed between an earliest and latest completed transactions of the particular transaction identifier range.

For instance, suppose that the computing system assigns monotonically increasing transaction identifiers as new transactions are completed. Now suppose the particular transaction identifier range included transaction identifiers 4, 6 and 8. Suppose further that the comparison transaction identifier range included transaction identifiers 7, 9 and 10. In that case, the particular transaction identifier range overlaps with the comparison transaction identifier range because the particular transaction identifier range includes a transaction identifier 8 which is indicative of the associated transaction being completed between an earliest completed transaction (having transaction identifier 7) and a latest completed transaction (having transaction identifier 10) of the comparison transaction identifier range. As a separate reason for overlap, the comparison transaction identifier range includes a transaction identifier 7 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 9, 10, 11. Now there is no overlap because both conditions of non-overlap are satisfied. Specifically, the first condition is that the particular transaction identifier range includes no transaction identifiers (the highest being transaction identifier 8) which is indicative of the associated transaction being completed between an earliest completed transaction (having transaction identifier 9) and a latest completed transaction (having transaction identifier 11) of the comparison transaction identifier range. The second condition is that the comparison transaction identifier range includes no transaction identifiers (the lowest being transaction identifier 9) which is indicative of the associated transaction being completed between an earliest completed transaction (having transaction identifier 4) and a latest completed transaction (having transaction identifier 8) of the particular transaction identifier range.

The non-overlapping conditions also apply when the comparison transaction identifier range includes transactions completed earlier than the transactions of the particular transaction identifier range. For instance, suppose that the comparison transaction identifier range includes transaction identifiers 1, 2 and 5. In that case, the particular transaction identifier range overlaps with the comparison transaction identifier range because the particular transaction identifier range includes a transaction identifier 4 which is indicative of the associated transaction being completed between an earliest completed transaction (having transaction identifier 1) and a latest completed transaction (having transaction identifier 5) of the comparison transaction identifier range. As a separate reason for overlap, the comparison transaction identifier range includes a transaction identifier 5 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 1, 2 and 3. Now there is no overlap because both conditions of non-overlap are satisfied. Specifically, the first condition is that the particular transaction identifier range includes no transaction identifiers (the lowest being transaction identifier 4) which is indicative of the associated transaction being completed between an earliest completed transaction (having transaction identifier 1) and a latest completed transaction (having transaction identifier 3) of the comparison transaction identifier range. The second condition is that the comparison transaction identifier range includes no transaction identifiers (the highest being transaction identifier 3) which is indicative of the associated transaction being completed between an earliest completed transaction (having transaction identifier 4) and a latest completed transaction (having transaction identifier 8) of the comparison transaction identifier range.

As an example, suppose there were three transaction segment identifier ranges: a first associated with transaction identifiers 0 through 2; a second associated with transaction identifiers 3 through 5; and a third associated with transaction identifiers 6 through 8. In this case, the first, second, and third transaction identifier ranges do not overlap. The non-overlapping condition with respect to transaction identifiers is referred to as the "compactness" condition with respect to transaction identifiers. However, the meeting of the compactness condition with respect to transaction identifiers does not mean that the compactness condition is met with respect to the log entries themselves.

For instance, referring back to FIG. 2, bracket 201 shows a range of entries in the log spanning from the first task of the first initiated transaction of a first transaction identifier range to the last task of the last completed transaction of the first transaction identifier range. Likewise, bracket 302 shows a range of entries in the log spanning from the first task of the first initiated transaction of a second transaction identifier range to the last task of the last completed transaction of the second transaction identifier range. Though the second transaction identifier range is non-overlapping with the first transaction identifier range, the brackets 201 and 202 do overlap. That is, there are some tasks that are bracketed by both brackets 201 and 202. This is because of the parallel processing nature of the computing system in that transactions are performed in parallel. Thus, the last task of the latest completed transaction in a prior non-overlapping transaction identifier range may indeed be completed after the first task of the first transaction of the subsequent non-overlapping transaction identifier range is initiated. Thus, transaction segments meet the compactness condition with respect to transaction identifiers, but do not guaranty or even aim to meet the compactness condition with respect to log entries.

Completing the example, bracket 203 shows a range of entries in the log spanning from the first task of the first initiated transaction of a third transaction identifier range to the last task of the last completed transaction of the third transaction identifier range. Again, though the third transaction identifier range is non-overlapping with the second transaction identifier range, the brackets 202 and 203 do overlap. This is again because last task of the latest completed transaction in a prior non-overlapping transaction identifier range may indeed be completed after the first task of the first transaction of the subsequent non-overlapping transaction identifier range is initiated.

Figure 3:
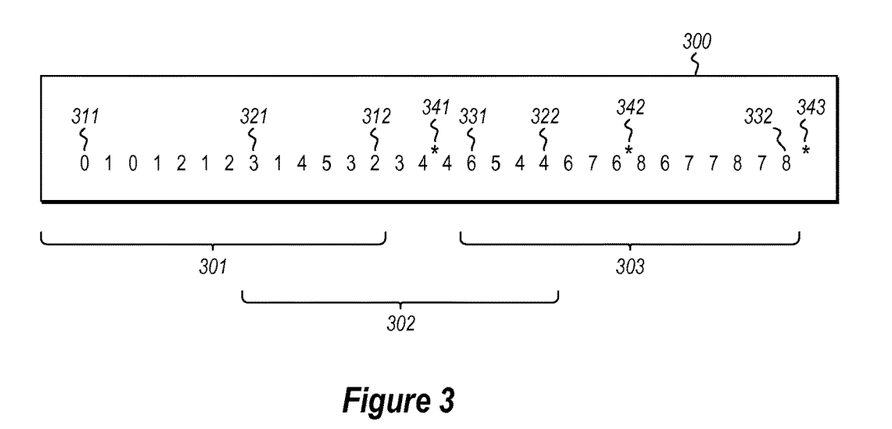
FIG. 3 illustrates a more specific example log that represents an example of the log of FIG. 2.

FIG. 3 illustrates a more specific example log 300 that represents an example of the log 200 of FIG. 2, in which the first brackets 301 is associated with transaction identifiers 0 through 2; the second brackets 302 is associated with transaction identifiers 3 through 5, and the third brackets 303 is associated with transaction identifiers 6 through 8. Each number within the log 300 represents a task entry having the number as the associated transaction identifier.

Figure 4:
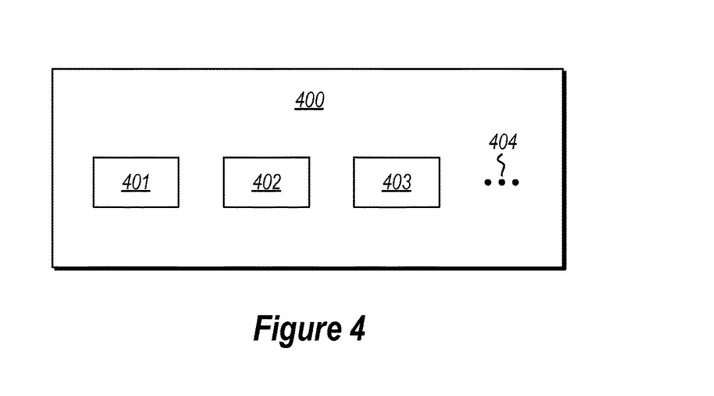
FIG. 4 illustrates a transaction segment record in accordance with the principles described herein.

FIG. 4 illustrates a transaction segment record 400 in accordance with the principles described herein. There may be a transaction segment record 400 created for each non-overlapping transaction identifier range. For instance, there may be a transaction segment record 400 for each of the non-overlapping transaction identifier ranges 301, 302 and 303 of FIG. 3.

The transaction segment record 400 includes the associated non-overlapping transaction identifier range 401, and also includes the associated log entry identifier range 402. An example of a log entry identifier is a log sequence number (LSN). Accordingly, an example of a log entry identifier range 402 is a log sequence number range.

For the transaction identifier range 0 to 2 associated with the bracket 301, the transaction segment record 400 would identify the transaction identifier range 0 to 2 within field 401. The transaction segment record 400 would also include a log entry identifier range 402 beginning at the first task entry 311 associated with the first initiated transaction of the transaction identifier range and ending at the last task entry 312 associated with the last completed transaction of the transaction identifier range. The transaction segment record may then be placed in the log after the last task entry 312. For instance, asterisk 341 may represent the transaction segment record for transaction identifier range 0 to 2 spanning bracket 301.

For the transaction identifier range 3 to 5 associated with the bracket 302 the transaction segment record 400 would identify the transaction identifier range 3 to 5 within field 401. The transaction segment record 400 would also a log entry identifier range 402 beginning at the first task entry 321 associated with the first initiated transaction of the transaction identifier range and ending at the last task entry 322 associated with the last completed transaction of the transaction identifier range. The transaction segment record may then be placed in the log after the last task entry 322. For instance, asterisk 342 may represent the transaction segment record for transaction identifier range 3 to 5 spanning bracket 302.

For the transaction identifier range 6 to 8 associated with the bracket 303 the transaction segment record 400 would identify the transaction identifier range 6 to 8 within field 401. The transaction segment record 400 would also a log entry identifier range 402 beginning at the first task entry 331 associated with the first initiated transaction of the transaction identifier range and ending at the last task entry 332 associated with the last completed transaction of the transaction identifier range. The transaction segment record may then be placed in the log after the last task entry 332. For instance, asterisk 343 may represent the transaction segment record for transaction identifier range 6 to 8 spanning bracket 303.

In some embodiments, the confirmation that a transaction segment definition record is persisted allows the next one to be persisted. Therefore these transaction segment records will be in transaction identifier order in the log." Accordingly, in FIG. 3, the transaction segment record 341 associated with transaction identifier range 0 to 2 is placed in the log 300 prior to the transaction segment record 342 associated with the transaction identifier range 3 to 5. Likewise, the transaction segment record 342 associated with transaction identifier range 3 to 5 is placed in the log 300 prior to the transaction segment record 343 associated with the transaction identifier range 6 to 8.

At least some of the transaction segment records for the sequence of transaction segment records includes a latest external dependee entity. For instance, transaction segment record 400 is illustrated as including an identifier 403 for a latest external dependee entity 403. For instance, this latest external dependee entity may be the latest entity for which processing should be completed before processing of the current transaction segment is performed. As previously mentioned, a transaction within a particular transaction segment may depend on completion of processing of external latest dependee entity, such as perhaps another transaction segment or a transaction in another transaction segment.

Accordingly, the identified latest external dependee entity may be another transaction segment or perhaps a transaction within another transaction segment. The transaction segment record 400 also includes potentially other fields 404, as represented by the ellipses.

Figure 5:
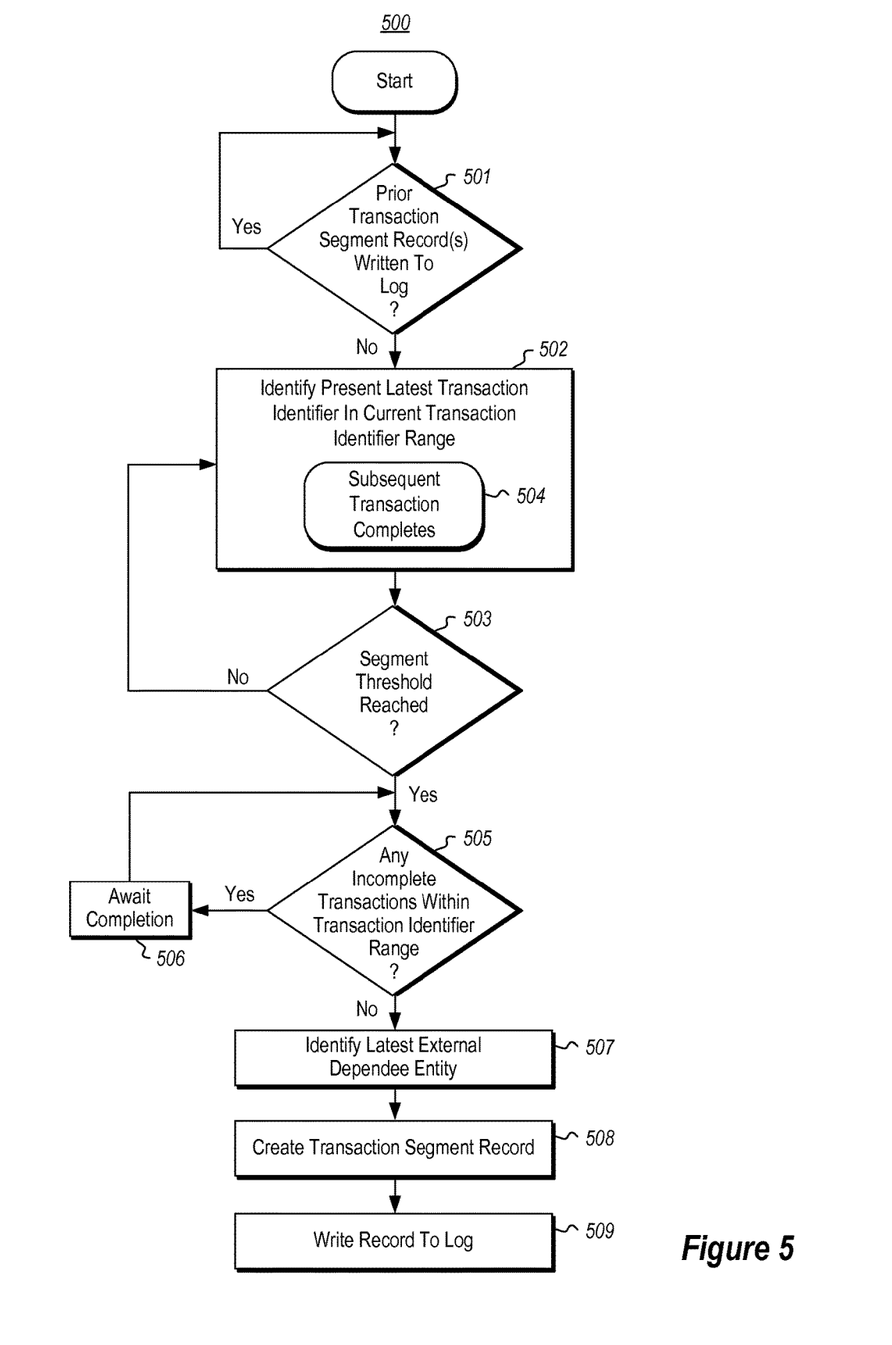
FIG. 5 illustrates a flowchart of a method for creating a transaction segment record, which may be used to create each transaction segment record in the sequence of transaction records.

FIG. 5 illustrates a flowchart of a method 500 for creating a transaction segment record, which may be used to create each transaction segment record in the sequence of transaction records. For instance, with reference to FIG. 3, the method 500 may be applied three times to generate transaction segment records 341, 342 and 343.

It is determined whether any prior transaction segment records, if any, in the sequence of transaction segment records have been written to the log (decision block 501). For instance, transaction segment record 341 is the first transaction segment record 341 in the sequence of three transaction segment records of FIG. 3. Accordingly, there are no prior transaction segment records that are to be written to the log ("Yes" in decision block 501). If the method 500 were being performed with respect to the transaction segment record 342, then transaction segment record 341 would first be written to the log in order to follow the "Yes" branch in the decision block 501 of FIG. 5. If the method 500 were being performed with respect to the transaction segment record 343, then transaction segment record 342 would first be written to the log in order to follow the "Yes" branch in the decision block 501 of FIG. 5. If there did exist prior transaction segment records that are yet to be written to the log ("No" in decision block 501), then the method 500 would simply await the writing of all prior transaction segment records in the sequence to be written to the log.

Upon determining that all prior transaction segment records have been written to the log ("Yes" in decision block 501), the latest present transaction identifier range of the transaction segment record is identified (act 502). The beginning of the transaction identifier range to the latest present transaction identifier defines a current transaction identifier range for the transaction segment record.

It is then determined whether a threshold has been reached with respect to the transaction segment (decision block 503) based on the current transaction segment identifier range. An example of such a threshold might be a time-based threshold. For instance, the transaction segment might remain open for a certain amount of time. Alternatively, the transaction segment might close upon encountering a time threshold since the last new transaction was encountered in the log. The principles described herein contemplate any threshold. In the description which follows, an example threshold will be described in term of a size threshold. For instance, the threshold size might be the sum of the size of all transactions having a transaction identifier within the current transaction identifier range. This size may be defined as the cumulative sum of all of the sizes of the transactions as expressed in binary representation. If the size of the transactions has not reached a particular threshold ("No" in decision block 503), then the method 500 returns to act 502.

Note that the present latest transaction identifier may change resulting in a new identification of the present latest transaction identifier (act 502) if transactions later than a present latest transaction identifier are detected as completed (event 504). This would result in expansion in the current transaction identifier range for the transaction segment record. Event 504 remains active as a possibility until the size of the transactions has reached a particular threshold ("Yes" in decision block 503). This would result in a transition in the state of the transaction segment record such that a change in the transaction identifier range is no longer accepted. Hereafter, this state transition is referred to a transition from an open state (in which the transaction identifier range may expand if transactions later than a present latest transaction identifier are detected thereby thereafter preventing further expansion of the transaction identifier range) to a closing state (in which the transaction identifier range does not expand).

Once this state transition occurs, it is then determined whether there are any transactions have a transaction identifier within the present transaction identifier range that have not yet completed (decision block 505), either by being committed or aborted. If all of the transactions having a transaction identifier within the transaction identifier range have not been completed ("No" in decision block 505), then the method awaits completion of all of such transactions (act 506). Otherwise, if all of the transactions having a transaction identifier within the transaction identifier range have been completed ("Yes" in decision block 505), then the latest external dependee entity is identified (act 507). Thereafter, the transaction segment record is created (act 508) (which includes an identification of the latest external dependee entity). Finally, the transaction segment is placed into the log (act 509) or is otherwise associated with the log. The creation of the transaction segment record may result in a future iteration of the method 500 with respect to the subsequent transaction segment record branching along the "Yes" branch of FIG. 5.

A subsequent transaction segment (or subsequent transaction) depends on a prior transaction segment (or prior transaction) if the previous version of the object (e.g., a row) to be operated upon was created by the prior transaction in the prior transaction segment. Additionally, a subsequent transaction segment (or subsequent transaction depends on a prior transaction segment (or a prior transaction) if the previous transaction segment includes a previous transaction that satisfies a precondition (the creation of a table) for performing a task (e.g., creation of a row in that table) performed in the subsequent transaction in the subsequent transaction segment. For instance, for inserting a new data row, there is a dependency on the transaction that created the table where the row is to be created. For updated or deleting a row, there is a dependency on the last transaction that modified or inserted the row.

Figure 6:
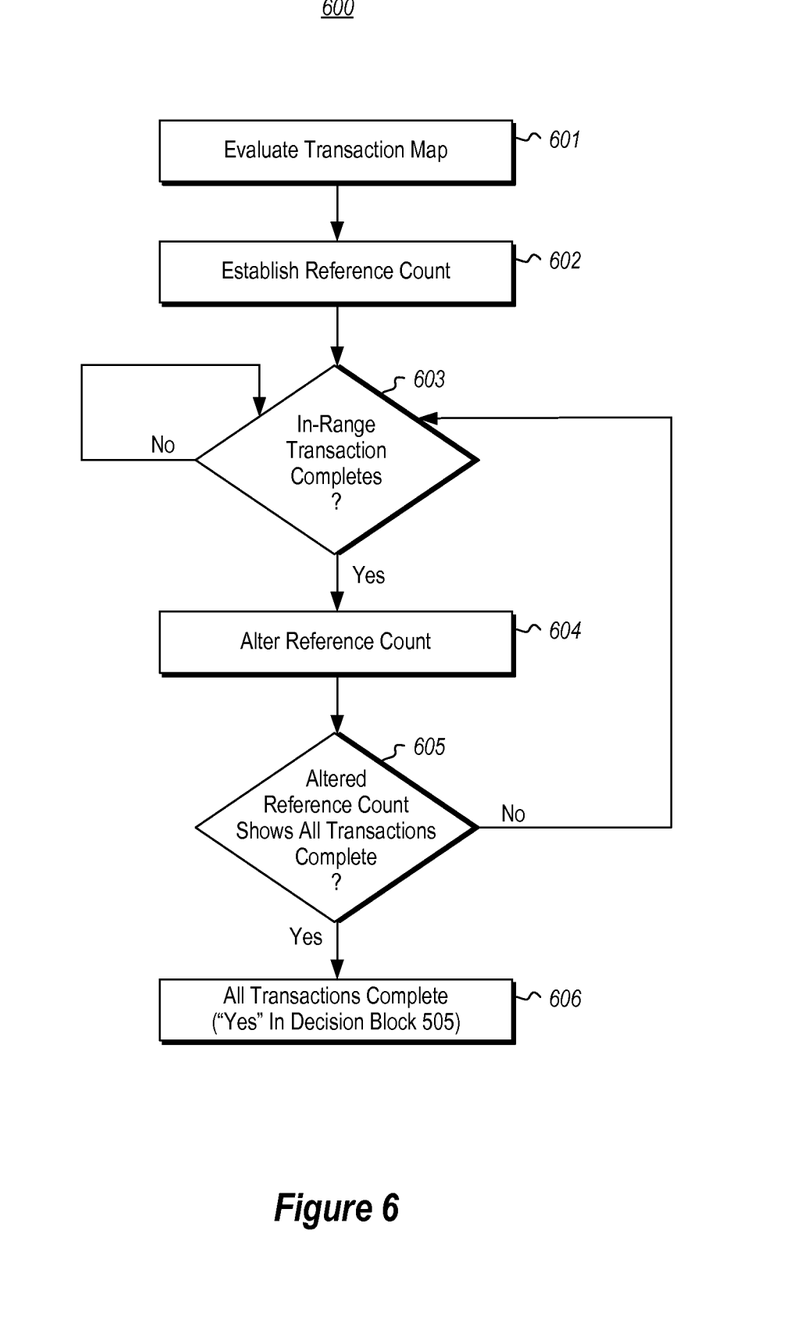
FIG. 6 illustrates a flowchart of a method for determining if there are any transactions having a transaction identifier within the present transaction identifier range that have not yet completed.

FIG. 6 illustrates a flowchart of a method 600 for determining if there are any transactions having a transaction identifier within the present transaction identifier range that have not yet completed. The method 600 represents one example of how decision block 505 might be performed. First, a transaction map is evaluated that shows active transactions according to transaction identifier (act 601). Then a reference count is established based on how many active transactions there are within the transaction identifier range (act 602) that have not yet completed. If a transaction having a transaction identifier within the transaction identifier range is not detected as completed ("No" in decision block 603), then the method 600 remains at decision block 603.

Thereafter, however, each time a transaction having a transaction identifier within the transaction identifier range is detected as completed ("Yes" in decision block 603), the reference count is altered (act 604) so as to represent a decrementing of the identified number of transactions within the transaction identifier range that having not yet completed. If the reference count still represents that one or more transactions are yet to be completed ("No" in decision block 605), then the method 600 returns to decision block 603 to await another indication that a transaction within range of the transaction identifier range has completed. Otherwise ("Yes" in decision bloc 605), if the reference count indicates that all transactions have completed, then the method 600 ends (act 606) resulting in a branching along the "Yes" branch of decision block 505 of FIG. 5. Again, this would result in creation of the transaction segment record (act 507) and the writing of the transaction segment record to the log (act 508).

Previously, this description has mentioned that when a transaction segment is in an open state, the transaction segment may receive notifications that new transactions have completed, resulting in potentially expansion of the current transaction identifier range. However, when the transaction segment transitions to a closing state, the transaction segment no longer expand the transaction identifier range associated with the transaction segment. In one embodiment, the open transaction segment may be represented by a data structure that is relatively small—such as perhaps 256 or even 128 bits or less. This allows changes to be made to the open transaction segment data structure in one processing cycle, thereby ensuring that changes to the open transaction segment data structure are made atomically. Thus, the open transaction segment data structure may be lockless, such that no locks need be taken on that data structure. Such allows for efficient management of the open transaction segment data structure such that millions of transactions may be processed per second.

Figure 7:
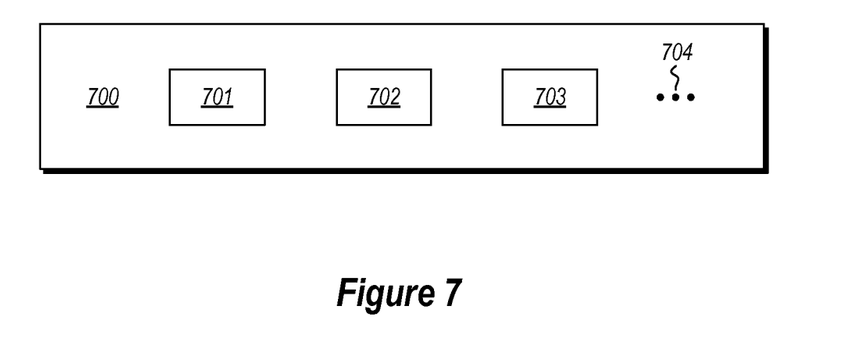
FIG. 7 illustrates an example of the open transaction segment data structure 700.

FIG. 7 illustrates an example of an open transaction segment data structure 700. Within the open transaction segment data structure 700 may be a number of fields including the beginning transaction identifier 701 and the current latest transaction identifier 702. The open transaction segment data structure 700 could also include a "can close" bit 703, representing that the transaction segment has reached a predetermined cumulative size (and thus branched along "Yes" in decision block 503). The open transaction segment data structure 700 may also include other fields as represented by ellipses 704). The method 500 causes there to be only one open transaction segment at a time. This is because the method 500 is not re-performed until the prior iteration of the method 500 has completed act 508, resulting in the transaction segment record being written to the log, and thereby initiating the method 500 for the next transaction segment along the "Yes" branch in decision block 501. Accordingly, there need only be a single open transaction segment data structure 700 at a time. This simplicity allows for high volume in handling transactions as each transaction segment passes through the open transaction segment data structure 700 as a gateway, allowing the transactions to be processed by a single thread and managing all information in a small data structure. The open transaction segment data structure 700 may be changed millions of times a second to handle millions of completed transactions per second.

Figure 8:
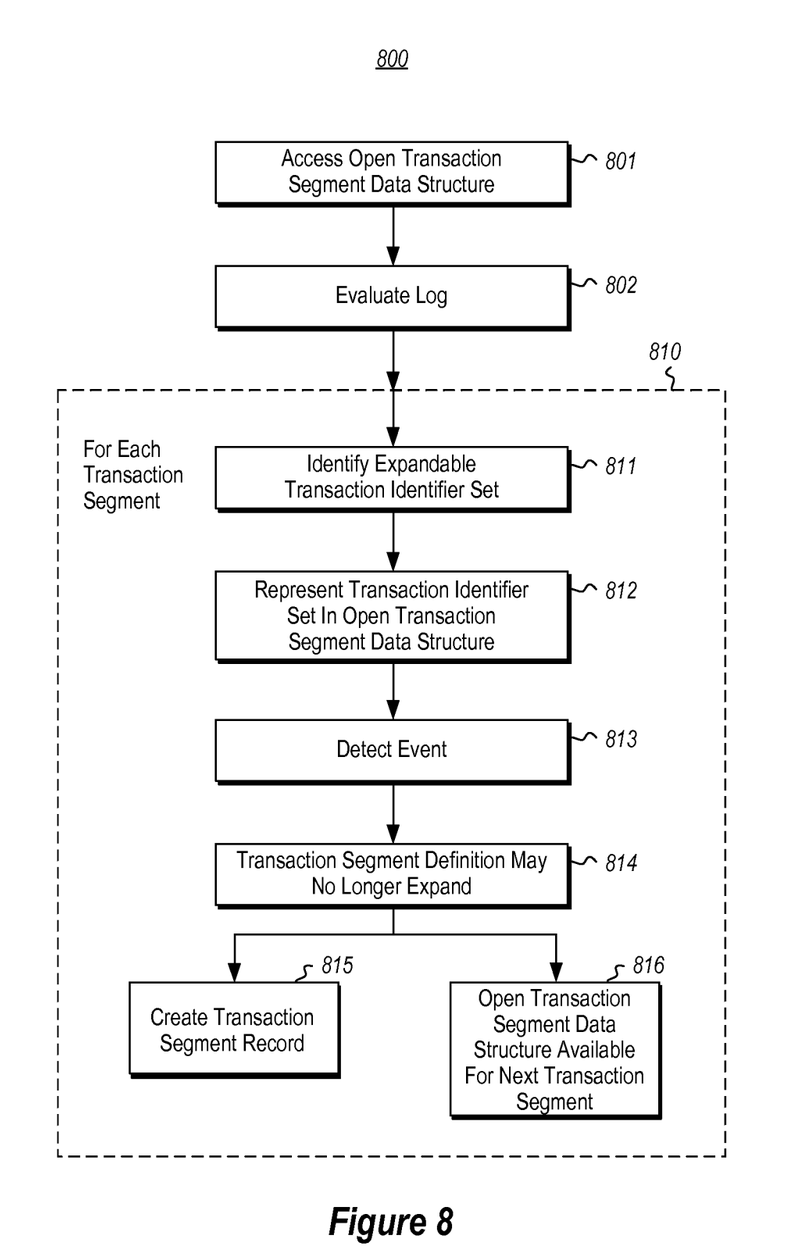
FIG. 8 illustrates a flowchart for a method for using an open transaction segment data structure to create a sequence of transaction segment records.

FIG. 8 illustrates a flowchart for a method 800 for using an open transaction segment data structure to create a sequence of transaction segment records. The method 800 includes accessing the open transaction segment data structure (act 801) and evaluating a log that includes multiple log entries associated with different transaction (act 802). For instance, the computing system 100 of FIG. 1 may access the open transaction data structure 700 of FIG. 7 (act 801), and also begin evaluation of the log 200 (act 802). In accordance with act 810, the open transaction segment data structure is then used to create the sequence of transaction segment records.

Specifically, as part of the act 810, the system identifies an expandable transaction segment definition (i.e., the expandable transaction identifier set or range) associated with an open transaction segment for which a transaction segment record is to be created (act 811). This was described above with respect to act 502 and event 504 of FIG. 5. So long as the event 504 is active due to the transaction segment being in an open state, the transaction segment definition remains expandable. The transaction segment definition while expandable may at least in some instances be expanded to include log entries of a particular transaction identifier if the last data item of that particular transaction identifier is encountered in the log. For instance, as described above, upon detection of event 504, the transaction segment may expand.

The method 800 then includes representing the expandable transaction segment definition within the open transaction segment data structure (act 812). For instance, the transaction segment collection data structure 700 has been described as representing the transaction segment definition within field 701. The field 701 may include an internally descriptive definition, or may simply point to another location that defines a full transaction segment definition.

Furthermore, upon detecting an event (act 813), it is determined that the transaction segment definition is no longer expandable. This has been described above with respect to the event 504 causing the transaction segment definition to expand, but once the transaction segment is determined to be a particular size ("Yes" in decision block 503), it is determined that the transaction segment definition may no longer expand (act 814). At this point, the identifier for the latest dependee entity, if any, may also be represented in the transaction segment record. In response, the transaction segment record is created (act 507 and also act 815), and the open transaction segment data structure is also made available for use by the next transaction segment (act 816). Note that act 816 is shown in parallel with act 815 to represent that there is no time dependency between the two acts. That said, unless the transaction segment record for the current transaction segment is generated, the next transaction segment is not closed. However, at the same time, when the current transaction segment is marked as full (act 814) (meaning it can no longer expand), events are classified to the next transaction segment—meaning that the next transaction segment is open for allocation often even before the transaction segment record is written to the log itself.

Figure 9:
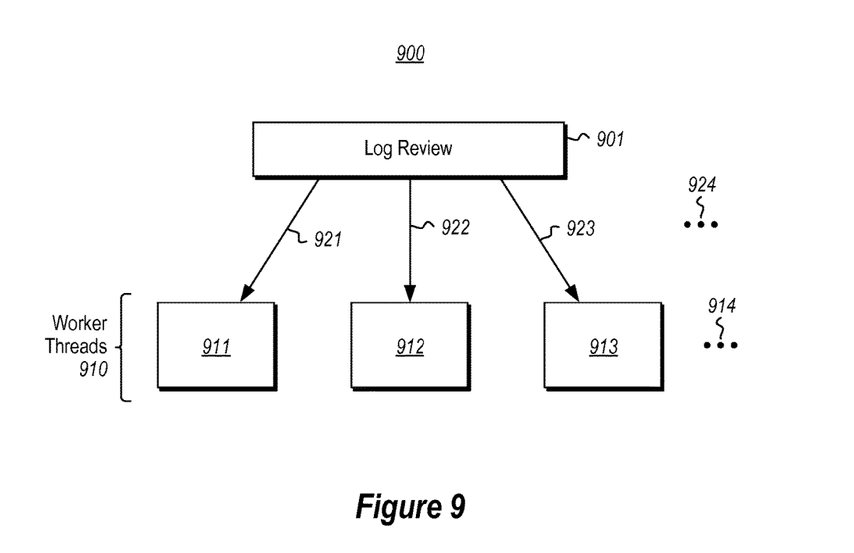
FIG. 9 illustrates an architecture associated with the use of a log that includes therein a sequence of transaction segment records, and that includes a sequence of tasks performed with respect to multiple transactions.

FIG. 9 illustrates an architecture 900 associated with the use of a log that includes therein a sequence of transaction segment records, and that includes a sequence of tasks performed with respect to multiple transactions. For instance, the architecture 900 may be used to process the log 200 of FIG. 2, or the log 300 of FIG. 3. The architecture 900 includes a log review module 901, and multiple worker threads 910. For instance, in FIG. 9, the worker threads are illustrated as three worker threads 911, 912 and 913, but the ellipses 914 represents that there may be any number of worker threads 910 in operation, and the number of worker threads in operation 910 may vary over time.

Figure 10:
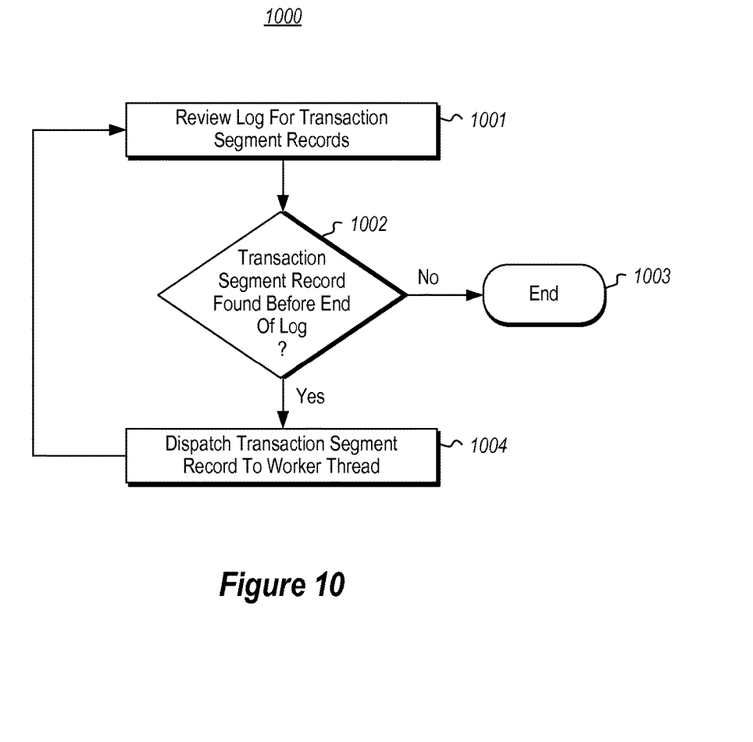
FIG. 10 illustrates a flowchart of a method for using the log from the perspective of the log review module of FIG. 9.

FIG. 10 illustrates a flowchart of a method 1000 for using the log from the perspective of the log review module 901 of FIG. 9. The log review module 901 reviews the log to find the sequence of transaction segment records (act 1001). Such a review may be performed quickly since most log entries may simply be skipped over upon confirming that the task entry is not a transaction segment record. Then, when the log review module finds a transaction segment record ("Yes" in decision block 1002), the corresponding transaction segment record is dispatched to a corresponding worker thread (act 1004). This may involve starting a worker thread if there is not previously a worker thread available. The log review module 901 thereafter continues to review the log (act 1001). Once the end of the log is encountered ("No" in decision block 1003), the method ends (act 1004).

For instance, applying the method 1000 of FIG. 10 and the architecture 900 of FIG. 9 to the example log 300 of FIG. 3, the log review module 901 would scan the log 300 (act 1001) until the transaction segment record 341 is found ("Yes" in decision block 1002). The log review module 901 would then dispatch (as represented by arrow 921) the transaction segment record 341 to a worker thread 911 (act 1004), and continue scanning the log (act 1001) for more transaction segment records.

The log review module 901 would next encounter transaction segment record 342 ("Yes" in decision block 1002). The log review module 901 would then dispatch (as represented by arrow 922) the transaction segment record 342 to a worker thread 912 (act 1004), and continue scanning the log (act 1001) for more transaction segment records.

The log review module would next encounter transaction segment record 343 ("Yes" in decision block 1002). The log review module 901 would then dispatch (as represented by arrow 923) the transaction segment record 343 to a worker thread 913 (act 1004), and continue scanning the log (act 1001) for more transaction segment records. However, no further transaction segment records are found in the log 300 ("No" in decision block 1003), and thus the method 300 would end (act 1003). If there were more transaction segment records and more worker segments (as represented by ellipses 913), then the method 1000 may be iterated further in order to dispatch (as represented by ellipses 924) the transaction segments to those other worker segments as well.

Figure 11:
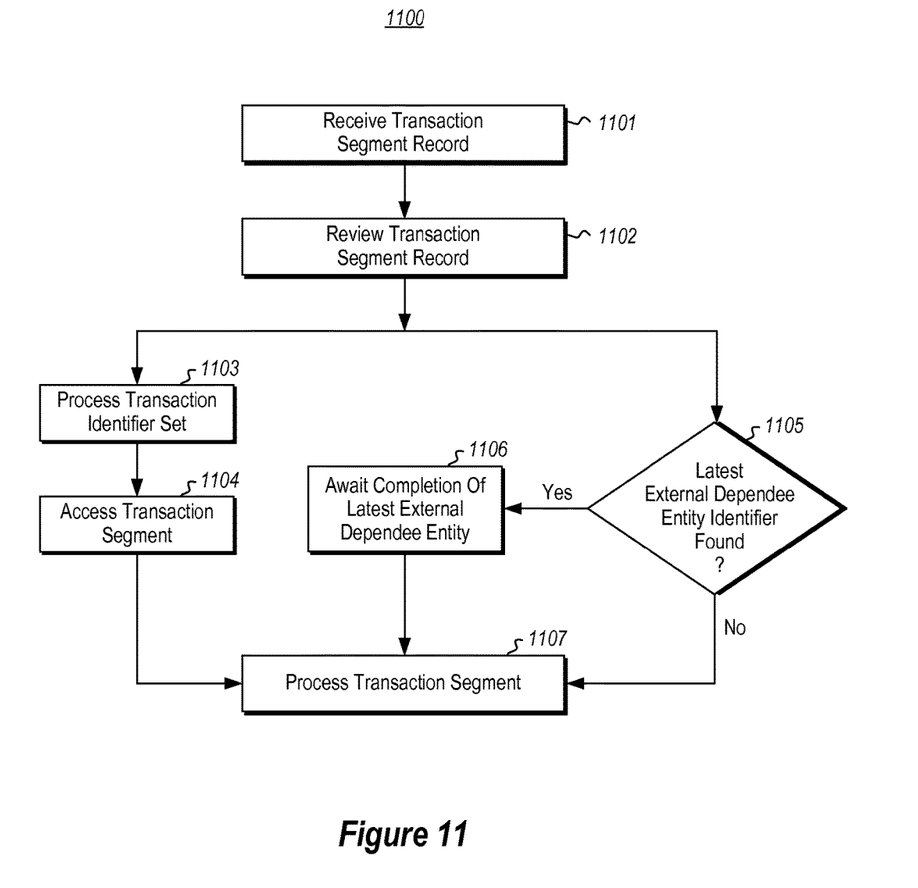
FIG. 11 illustrates a flowchart of a method for using the log from the perspective of any of the worker threads of FIG. 9.

FIG. 11 illustrates a flowchart of a method 1100 for processing the log from the perspective of any of the worker threads 910 of FIG. 9. The corresponding worker thread receives the transaction segment record (act 1101). In response, the worker thread reviews the transaction segment record (act 1102) to acquire the transaction identifier set (e.g., the transaction identifier range) (act 1103). The worker thread then accesses the transaction segment (act 1104) using the transaction identifier set. In the embodiment in which the transaction segment record also includes a log address range, this accessing of the transaction segment may involve accessing the log along the extent of the log address range.

In addition, when reviewing the transaction segment record (act 1102), the worker thread may encounter a latest external dependee entity ("Yes" in decision block 1105). In that case, the method 1100 awaits completion of processing (act 1106) (by another worker thread) of the latest external dependency, and thereafter processes (act 1107) the accessed transaction segment. Otherwise, if there is no latest external dependee entity identified ("No" in decision block 1105), processing of the transaction segment may proceed (act 1107) immediately. Examples of processing (act 1107) the transaction segment include performing a redo of the transactions, such as perhaps during a recovery operation.

As an example, suppose that worker thread 911 of FIG. 9 is processing the transaction segment represented by the bracket 301 in FIG. 3. Now suppose that worker thread 912 of FIG. 9 is processing the transaction segment represented by bracket 302 of FIG. 3. If the transaction segment record 342 indicated that the first transaction segment is a latest external dependee entity, the worker thread 912 would await the worker thread 911 completing processing of the transaction segment (represented by bracket 301) prior to the worker thread 912 processing its transaction segment (represented by bracket 301). Likewise, if the transaction segment record 342 identified one of the transactions within bracket 301 as being the latest external dependee entity, the worker thread 912 would await the worker thread 911 completing processing of the particular transaction within the transaction segment (represented by bracket 301) prior to the worker thread 912 processing its transaction segment (represented by bracket 302).

The log scanning and dispatching of transaction records of FIG. 10 may occur relatively quickly. In contrast, the processing of the transaction records of FIG. 11 may take a little more time. Thus, the processing of the log may be viewed as a quick dispatch (of FIG. 10) and parallel processing (of FIG. 11) operation. This allows the worker threads to process each transaction segment substantially in parallel, thereby allowing the log as a whole to be processed more quickly. Such parallel operations are facilitated by the fact that the transaction segment records themselves have compactness with respect to transaction identifiers. Thus, each worker thread may process the transactions within the transaction identifier range without conflicting processing from other worker threads trying to also process tasks from that same transaction.

Accordingly, the principles described herein provide an effective mechanism to create a transaction segment record that has compactness with respect to transaction identifiers. This compactness allows for quick dispatch and parallel processing of the log, thereby significantly improving the efficiency of log processing operations—such as serialization and redo.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   a hardware storage device having thereon computer-executable instructions that are structured such that, when executed by the one or more processors causes the computing system to create transaction segments records associated with a log, the computer-executable instructions including instructions to perform at least the following:
   identify a plurality of transactions of the computing system, each transaction having an associated transaction identifier, each transaction also comprising a plurality of associated tasks; and
   separate the plurality of transactions into a plurality of transaction segments within a log, each transaction segment comprising a subset of the plurality of transactions and the plurality of tasks associated with the subset of the plurality of transactions, wherein for each given transaction segment, separating the plurality of transactions into a plurality of transaction segments comprises at least:
   defining a transaction identifier range that indicates a range of transaction identifiers of the subset of the plurality of transactions included within the given transaction segment, the transaction identifier range including each of the transaction identifiers associated with each of the subset of the plurality of transactions within the given transaction segment; and creating, for the given transaction segment, an associated transaction segment record that is placed within the log after completion of the subset of the plurality of transactions defined by the transaction identifier range of the given transaction segment, wherein creating the associated transaction segment record for each given transaction segment of at least one of the plurality of transaction segments includes at least:

identifying a latest external dependee entity that indicates dependence upon completion of a particular transaction included within another transaction segment, such that processing of the given transaction segment cannot begin until completion of processing the particular transaction;

inserting the identified latest external dependee entity into the given transaction segment record;

inserting a log address range at least extending from a first log entry of the given transaction segment to a last data item of the given transaction segment; and inserting the transaction identifier range into the given transaction segment record.

2. The computing system in accordance with claim 1, for at least one of the plurality of transaction segments in the log, the transaction identifier range is a single transaction identifier.

3. The computing system in accordance with claim 1, for at least one of the plurality of transaction segments in the log, the transaction identifier range comprises multiple transaction identifiers.

4. The computing system in accordance with claim 1, wherein none of the transaction segment identifier ranges overlap transaction identifier ranges corresponding to any other transaction segments of the log.

5. The computing system in accordance with claim 1, the latest external dependee entity comprising a transaction segment.

6. The computing system in accordance with claim 1, the latest external dependee entity comprising a transaction.

7. A computer program product comprising one or more hardware storage devices having thereon one or more computer-executable instructions that are structured such that, when executed by one or more processors of a computing system, cause the computing system to create transaction segments records associated with a log, the computer-executable instructions including instructions that are executable to cause the computing system to perform at least the following:

identify a plurality of transactions of the computing system, each transaction having an associated transaction identifier, each transaction also comprising a plurality of associated tasks; and separate the plurality of transactions into a plurality of transaction segments within a log, each transaction segment comprising a subset of the plurality of transactions and the plurality of tasks associated with the subset of the plurality of transactions, wherein for each given transaction segment, separating the plurality of transactions into a plurality of transaction segments comprises at least:

defining a transaction identifier set range that indicates a range of transaction identifiers of the subset of the plurality of transactions included within the given transaction segment, the transaction identifier range including each of the transaction identifiers associated with each of the subset of the plurality of transactions within the given transaction segment; and creating, for the given transaction segment, an associated transaction segment record that is placed within the log after completion of the subset of the plurality of transactions defined by the transaction identifier range of the given transaction segment, wherein creating the associated transaction segment record for each given transaction segment of at least one of the plurality of transaction segments includes at least:

identifying a latest external dependee entity that indicates dependence upon completion of a particular transaction included within another transaction segment, such that processing of the given transaction segment cannot begin until completion of processing the particular transaction;

inserting the identified latest external dependee entity into the given transaction segment record;

inserting a log address range at least extending from a first log entry of the given transaction segment to a last data item of the given transaction segment; and inserting the transaction identifier range into the given transaction segment record.

8. The computer program product in accordance with claim 7, for at least one of the plurality of transaction segments in the log, the transaction identifier range is a single transaction identifier.

9. The computer program product in accordance with claim 7, for at least one of the plurality of transaction segments in the log, the transaction identifier range comprises multiple transaction identifiers.

10. The computer program product in accordance with claim 7, wherein none of the transaction segment identifier ranges overlap transaction identifier ranges corresponding to any other transaction segments of the log.

11. The computer program product in accordance with claim 7, the latest external dependee entity comprising a transaction segment.

12. A method, implemented at a computing system including one or more processors, for creating transaction segments records associated with a log, the method comprising:

identifying a plurality of transactions of the computing system, each transaction having an associated transaction identifier, each transaction also comprising a plurality of associated tasks; and separating the plurality of transactions into a plurality of transaction segments within a log, each transaction segment comprising a subset of the plurality of transactions and the plurality of tasks associated with the subset of the plurality of transactions, wherein for each given transaction segment, separating the plurality of transactions into a plurality of transaction segments comprises at least:

defining a transaction identifier range that indicates a range of transaction identifiers of the subset of the plurality of transactions included within the given transaction segment, the transaction identifier range including each of the transaction identifiers associated with each of the subset of the plurality of transactions within the given transaction segment; and creating, for the given transaction segment, an associated transaction segment record that is placed within the log after completion of the subset of the plurality of transactions defined by the transaction identifier range of the given transaction segment, wherein creating the associated transaction segment record for each given transaction segment of at least one of the plurality of transaction segments includes at least:

identifying a latest external dependee entity that indicates dependence upon completion of a particular transaction included within another transaction segment, such that processing of the given transaction segment cannot begin until completion of processing the particular transaction;

inserting the identified latest external dependee entity into the given transaction segment record;

inserting a log address range at least extending from a first log entry of the given transaction segment to a last data item of the given transaction segment; and inserting the transaction identifier range into the given transaction segment record.

13. The method in accordance with claim 12, for at least one of the plurality of transaction segments in the log, the transaction identifier range is a single transaction identifier.

14. The method in accordance with claim 12, further comprising:

processing at least a first transaction segment and a second transaction segment of the plurality of transaction segments in parallel, wherein processing includes at least the following:

determining that the transaction segment record of the second transaction segment includes a latest external dependee associated with a specific transaction included within the first transaction segment, such that the second transaction segment cannot begin processing until the specific transaction.

15. The method in accordance with claim 12, wherein none of the transaction segment identifier ranges overlap transaction identifier ranges corresponding to any other transaction segments of the log.

16. The method in accordance with claim 12, the latest external dependee entity comprising a transaction segment.

17. The method in accordance with claim 12, the latest external dependee entity comprising a transaction.

\* \* \* \* \*